(12) United States Patent
Chatterji et al.

(10) Patent No.: US 9,120,962 B1
(45) Date of Patent: Sep. 1, 2015

(54) PLUGGING COMPOSITION USING SWELLABLE GLASS ADDITIVES

(71) Applicant: Halliburton Energy Services, Inc., Houston, TX (US)

(72) Inventors: Jiten Chatterji, Duncan, OK (US); Craig Wayne Roddy, Duncan, OK (US); Darrell Chad Brenneis, Marlow, OK (US); Gregory Robert Hundt, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/377,461

(22) PCT Filed: Jun. 25, 2014

(86) PCT No.: PCT/US2014/044094
§ 371 (c)(1),
(2) Date: Aug. 7, 2014

(51) Int. Cl.
*E21B 33/134* (2006.01)
*C09K 8/42* (2006.01)
*B01F 15/02* (2006.01)
*E21B 33/12* (2006.01)

(52) U.S. Cl.
CPC ............. *C09K 8/426* (2013.01); *B01F 15/0283* (2013.01); *E21B 33/12* (2013.01); *B01F 2215/0047* (2013.01)

(58) Field of Classification Search
CPC ........ C04B 24/42; E21B 33/134; E21B 33/16
USPC .................................................. 166/285, 292
See application file for complete search history.

(56) References Cited

U.S. PATENT DOCUMENTS

| | | |
|---|---|---|
| 5,271,464 A | 12/1993 | McCabe |
| 5,479,986 A | 1/1996 | Gano et al. |
| 5,685,372 A | 11/1997 | Gano |
| 6,516,883 B1 | 2/2003 | Chatterji et al. |
| 6,554,068 B1 | 4/2003 | Chatterji et al. |
| 6,767,398 B2 | 7/2004 | Trato |
| 7,424,914 B2 | 9/2008 | Reddy et al. |
| 7,607,482 B2 | 10/2009 | Roddy et al. |
| 7,607,484 B2 | 10/2009 | Roddy et al. |
| 7,617,870 B1 * | 11/2009 | Roddy et al. ................... 166/292 |
| 7,790,830 B2 | 9/2010 | Edmiston |
| 7,927,419 B2 | 4/2011 | Roddy et al. |
| 7,934,554 B2 | 5/2011 | Roddy |

(Continued)

FOREIGN PATENT DOCUMENTS

EP 2388240 * 11/2011 .............. C04B 24/40

OTHER PUBLICATIONS

Osorb Product Description available via http://www.absmaterials.com/osorb. Website dated 2013.

(Continued)

*Primary Examiner* — Angela M DiTrani
*Assistant Examiner* — Avi Skaist
(74) *Attorney, Agent, or Firm* — Craig W. Roddy; Tumey L.L.P.

(57) ABSTRACT

Methods and compositions for plugging in a subterranean formation are provided. An example comprises providing a composition comprising a cementitious material, water, and a swellable glass additive, wherein the swellable glass additive comprises a plurality of interconnected organosilica nanoparticles; and introducing the composition into a subterranean formation.

14 Claims, 7 Drawing Sheets

(56) References Cited

U.S. PATENT DOCUMENTS

| | | | |
|---|---|---|---|
| 8,030,253 B2 | 10/2011 | Roddy et al. | |
| 8,307,899 B2 | 11/2012 | Brenneis et al. | |
| 8,367,793 B2 | 2/2013 | Edmiston | |
| 8,486,869 B2 | 7/2013 | Brenneis et al. | |
| 2005/0061206 A1* | 3/2005 | Reddy et al. | 106/672 |
| 2008/0093073 A1* | 4/2008 | Bustos et al. | 166/279 |
| 2012/0032111 A1 | 2/2012 | Edmiston | |
| 2012/0048551 A1* | 3/2012 | Allison et al. | 166/292 |
| 2012/0328377 A1* | 12/2012 | Brenneis et al. | 405/267 |
| 2013/0029843 A1 | 1/2013 | Edmiston | |

OTHER PUBLICATIONS

Osorb Wikipedia entry available via http://en.wikipedia.org/wiki/Osorb. Entry last updated Dec. 2, 2013.

Enhancer 923 Cement Agent Product Description available via http://www.halliburton.com/public/cem/contents/Data_Sheets/web/A_through_G/Enhancer%20923%20cement%20agent_H07745%20sales%20data%20sheet.pdf. Website date 2010.

Hi-Dense Product Description available via http://www.halliburton.com/public/cem/contents/Chem_Compliance/web/H01334.pdf. Website dated 2007.

D-Air Defoamers Product Description available via http://www.halliburton.com/public/cem/contents/Chem_Compliance/web/H02518-A4.pdf. Website dated 2007.

ZoneSealant 2000 web page available via http://www.halliburton.com/en-US/ps/cementing/materials-chemicals-additives/agents/foamer/zonesealant-2000-agent.page?node-id=hfqelago#. Website dated 2014.

CFR-3 Cement Friction Reducer Product Description available via http://www.halliburton.com/en-US/ps/cementing/materials-chemicals-additives/agents/foamer/zonesealant-2000-agent.page?node-id=hfqelago#. Website dated 2005.

Ali Daneshy, Multistage fracturing using plug-and-perf systems, World Oil, vol. 232, No. 10, Oct. 2011. Available via http://www.worldoil.com/October-2011-Multistage-fracturing-using-plug-and-perf-systems.html.

P.L. Edmiston et al., Flow Back Water Treatment Using Swellable Organosilica Media. Society of Petroleum Engineers, SPE 148973, Aug. 17, 2011.

M.J. Chambers, Laying Sand Plugs With Coiled Tubing. Society of Petroleum Engineers, SPE 25496, Mar. 21, 1993.

Brian B. Beall, Novel Application of Nondamaging Polymer Plugs with Coiled Tubing Improves Efficiency of Temporary Well Isolation Projects. Society of Petroleum Engineers, SPE 51054, Nov. 9, 1998.

I. Aviles et al. Application and Benefits of Degradable Technology in Open-hole Fracturing. Society of Petroleum Engineers, SPE 166528, Sep. 30, 2013.

* cited by examiner

PLUGGING COMPOSITION USING SWELLABLE GLASS ADDITIVES

BACKGROUND

Plugging compositions comprising swellable glass additives and methods of use in subterranean formations are provided. The swellable glass additives may comprise a plurality of interconnected organosilica nanoparticles.

Temporary plugging may be a type of well operation. Generally, temporary plugging may be a method for effecting well control or zonal isolation. Many different types of plugs may be used in temporary plugging operations, including retrievable plugs, degradable plugs, destroyable plugs, etc. Temporary plugs may comprise many different designs and materials. For example, mechanical plugs may include a framework with a frangible element. Destroyable plugs may be composed of soft metals or even cement that may be destroyed through exposure to high pressure fluids and/or fracturing equipment; some may be drilled through to reestablish flow. Degradable plugs may lose their integrity upon contact with another material, in what is typically a chemical reaction.

Problems with temporary plugs may generally be due to the time and expense associated with removal of the plugs. Mechanical plugs may be run into the wellbore on tubing or cable and removed the same way. When the mechanical plugs are to be removed, the tools must be removed from the wellbore first and then the plug may be removed. Removing the plug and associated tools from the wellbore may cause additional expense and rig downtime. Destroyable plugs, such as cement plugs, may be drilled through or fractured after use. However, drilling through or fracturing the cement plug to reestablish flow within the wellbore often entails significant cost, rig downtime, and the use of additional equipment. It is, therefore, desirable to develop a temporary plug which may be readily removed to reestablish wellbore flow without incurring either significant expense or rig downtime.

BRIEF DESCRIPTION OF THE DRAWINGS

These drawings illustrate certain aspects of some of the embodiments of the present invention, and should not be used to limit or define the invention.

DETAILED DESCRIPTION

Figure 1:
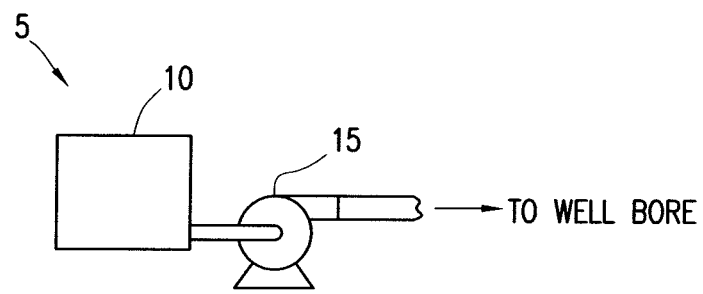
FIG. 1 is a schematic illustration of a system for the preparation and delivery of a plugging composition comprising a cementitious material and a swellable glass additive to a wellbore in accordance with certain embodiments.

Plugging compositions comprising swellable glass additives and methods of use in subterranean formations are provided. The swellable glass additives may comprise a plurality of interconnected organosilica nanoparticles. The methods of using the plugging compositions comprising the swellable glass additives may comprise temporary plugging, temporary abandonment, perforation plugging, and the like. The "swellable glass additives" disclosed herein may be referred to as "swellable" because the additives swell when in contact with certain organics such as organic solvents (e.g., crude oil, diesel, kerosene, and the like). The amount of swelling that may be induced in the swellable glass additive is a property determined by the specific swellable glass additive used, the specific organic solvent that contacts the swellable glass additive, the amount of organic solvent the contacts the swellable glass additive, and the duration of the contact the organic solvent makes with the swellable glass additive.

The swellable glass additives may be included in temporary plugging compositions. The swellable glass additives may be included in the temporary plugging compositions in conjunction with a cementitious material. The swellable glass additive may be included in the temporary plugging compositions for the purpose of swelling and subsequently fracturing the cementitious material after it has set. For example, a temporary plugging composition comprising a cementitious material and a swellable glass additive may be used in a temporary plugging operation to plug a section of a wellbore, for example, to isolate a zone of the wellbore. When it is desired to reestablish flow within the isolated zone, the temporary plug may be removed by inducing swelling in the swellable glass additive. As the swellable glass additive swells, it applies force to the hardened mass of the set cementitious material. This force may cause the hardened mass of the set cementitious material to fracture into several smaller masses that are no longer capable of plugging that zone of the wellbore and in so doing flow is reestablished in that zone of the wellbore. An advantage of the compositions and methods described herein is that it may not be necessary to drill through the set temporary plugs. An additional advantage is that the set temporary plugs need not be removed from the wellbore in order to reestablish flow. A further advantage is that the temporary plugs formed by the temporary plugging compositions need only be exposed to organic solvents in order to fracture, and thus, the process of destroying the temporary plug does not incur significant expense or rig downtime compared to some of the other methods for removing and/or destroying temporary plugs.

The temporary plugging compositions may comprise one or more cementitious materials. Cementitious materials may comprise any of a variety of cementitious materials or cementitious combinations of materials that are capable of setting or otherwise developing compressive strength in the presence of water. Examples include hydraulic cement, kiln dust, and the like. The cementitious material may be included in the temporary plugging compositions in an amount desired for a particular application. The cementitious material may be present in an amount of about 50% to about 100% by weight of the temporary plugging composition (e.g., about 50%, about 60%, about 70%, about 80%, about 90%, etc.). The cementitious material may be present in an amount of about 75% to about 99%, in an amount of about 80% to about 95%, or in an amount of about 85% to about 90% by weight of the temporary plugging composition.

Any of a variety of hydraulic cements suitable for use in subterranean cementing operations may be used as the cementitious material of the temporary plugging compositions. Suitable examples include hydraulic cements that comprise calcium, aluminum, silicon, oxygen and/or sulfur, which set and harden by reaction with water. Examples of such hydraulic cements, include, but are not limited to, Portland cements, pozzolana cements, gypsum cements, high-alumina-content cements, slag cements, silica cements, and combinations thereof. The hydraulic cement may comprise a Portland cement. The Portland cements are classified as Classes A, C, H, or G cements according to American Petroleum Institute, *API Specification for Materials and Testing for Well Cements*, API Specification 10, Fifth Ed., Jul. 1, 1990. In addition, the hydraulic cement may include cements classified as ASTM Type I, II, or III.

Kiln dust, as that term is used herein, refers to a solid material generated as a by-product of the heating of certain materials in kilns. The term "kiln dust" as used herein is intended to include kiln dust made as described herein and also equivalent forms of kiln dust. Kiln dust typically exhibits cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement and are commonly disposed of as waste. Disposal of the cement kiln dust can add undesirable costs to the manufacture of the cement, as well as create environmental concerns associated with its disposal. The chemical analysis of the cement kiln dust from various cement manufactures varies depending on a number of factors, including the particular kiln feed, the efficiencies of the cement production operation, and the associated dust collection systems. Cement kin dust generally may comprise a variety of oxides, such as $SiO_2$, $Al_2O_3$, $Fe_2O_3$, CaO, MgO, $SO_3$, $Na_2O$, and $K_2O$. Problems may also be associated with the disposal of lime kiln dust, which may be generated as a by-product of the calcination of lime. The chemical analysis of lime kiln dust from various lime manufacturers varies depending on a number of factors, including the particular limestone or dolomitic limestone feed, the type of kiln, the mode of operation of the kiln, the efficiencies of the lime production operation, and the associated dust collection systems. Lime kiln dust generally may comprise varying amounts of free lime and free magnesium, lime stone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides.

Those of ordinary skill in the art will appreciate that the temporary plugging compositions generally should have a density suitable for a particular application. By way of example, the temporary plugging compositions may have a density of about 4 pounds per gallon ("lb/gal") to about 20 lb/gal. The temporary plugging compositions may comprise a means to reduce the density of the composition, such as hollow microspheres, low-density elastic beads, or other density-reducing additives known in the art. Weighting agents may be used to increase the density of the temporary plugging composition. Those of ordinary skill in the art, with the benefit of this disclosure, will recognize the appropriate density for a particular application.

Swellable glass additives may be included in the temporary plugging compositions. The swellable glass additives may generally include a plurality of interconnected organosilica nanoparticles. The swellable glass additive may be included in a temporary plugging composition to fracture the hardened mass of set cementitious material. For example, the swellable glass additive, when exposed to a sufficient amount of suitable organic solvent may swell to a volume several times larger than the volume of the dried swellable glass additive. In addition, by inclusion of the swellable glass additive, a temporary plug may be destroyed without the need to drill through it.

A wide variety of swellable glass additives may be employed. Generally these additives may be described as a plurality of interconnected organosilica nanoparticles. More particularly, the swellable glass additives may include bridged organosiloxane sol-gels comprising a plurality of alkysiloxy substituents. Without being limited by theory, these additives may generally be produced by a process that includes taking a bridged organosiloxane sol-gel comprising residual silanols and then derivatizing the residual silanols of the sol-gel with a reagent having at least one group that is reactive with the residual silanols and also at least one alkyl group. More specifically, preparation of the sol-gel may generally include forming the interconnected organosilca nanoparticles from bridged silane precursor molecules through polymerization using an acid or base catalyst. After gelation, the sol-gel may be aged sufficiently to undergo syneresis. At this point, the sol-gel may be derivatized as described above to end-cap the silanol-terminated polymers present on the sol-gel. Typical derivatization reagents may include, but are not limited to, halosilanes, silazanes, disilazanes, and the like. The derivatized sol-gel may then be dried, and/or ground into a fine powder, for use as a swellable glass additive. A commercially available example of a swellable glass additive is Osorb® swellable glass, available from ABSMaterials, Inc. of Wooster, Ohio.

The swellable glass additive is swellable upon contact with organic solvents. The amount of swelling that may induced in the swellable glass additive is a property determined by the specific swellable glass additive used, the specific organic solvent that contacts the swellable glass additive, the amount of organic solvent the contacts the swellable glass additive, and the duration of the contact the organic solvent makes with the swellable glass additive. The swellable glass additive may swell to a volume greater than about 1.5 times to about 10 times or more the dried volume of the swellable glass additive. By way of example the swellable glass additive may swell to a volume of about 2 times, about 3 times, about 5 times, about 7 times, about 10 times, or more the dried volume of the swellable glass additive. As discussed above, the swellable glass additive may swell upon contact with organic solvents. By way of example and without limitation, the swellable glass additive may swell upon contact with any of a variety of organic solvents such as kerosene, diesel, crude oil, produced oil, ethanol, acetonitrile, methyl-t-butyl ethyl, dichloromethane, hydrocarbons such as hexane or octane, aromatic hydrocarbons such as benzene, toluene, xylene, nitrobenzene, phenol, m-nitrophenol, chlorinated organic solvents such as trichloroethylene, perchloroethylene, dichloroethylene, vinyl chloride, polycarbonated biphenyls, and the like. Among other things, use of a swellable glass additive may help reduce the expense and downtime associated with plug removal by providing a temporary plug that is easily removed by contact with an organic solvent. This process of plug removal may not require drilling through the plug or the use of other plug destroying operations, equipment, or techniques.

Combinations of swellable glass additives may also be used. Other swellable glass additives that behave in a similar fashion with respect to organic solvents may also be suitable. Those of ordinary skill in the art, with the benefit of this disclosure, will be able to select an appropriate swellable glass additive for use in the example temporary plugging compositions based on a variety of factors, including the properties required for the temporary plug and the desired swelling characteristics.

The swellable glass additives generally may be in particulate form for use as a dry powder. As used herein, the term "particulate" refers to materials in solid state having a well-defined physical shape as well as those with irregular geometries, including any particulates having the physical shape of platelets, shavings, fibers, flakes, ribbons, rods, strips, spheroids, hollow beads, toroids, pellets, tablets, or any other physical shape. The swellable glass additives may be ground through any sufficient process to achieve a suitable size. The powdered form of the swellable glass additives may have a particle size in the range of between about 1 micron to about 500 microns, about 10 microns to about 350 microns, or about 50 microns to about 250 microns. However, particle sizes outside this disclosed range may also be suitable for particular applications. The swellable glass additive also may be dried for inclusion into the temporary plugging composition and for ease of transport. Without limitation, the swellable glass additive may be dried by any sufficient means to produce a swellable glass additive that is easily added to the other components of the temporary plugging composition. With the benefit of this disclosure, one having ordinary skill in the art will be able to select an appropriately size of swellable glass additive.

The swellable glass additive may be added to the temporary plugging composition by any suitable procedure, including dry blending with the cementitious material before the addition of water, by mixing with the water to be added to the cementitious material, or by mixing with the cementitious material consecutively with or after the addition of the water. Moreover, the swellable glass additive may be included in the temporary plugging compositions in an amount desired for a particular application. The swellable glass additive may be present in an amount of about 0.1% to about 15% by weight of the cementitious material ("bwoc"). The swellable glass additive may be present in an amount of about 1% to about 10% bwoc, in an amount of about 0.1% to about 7.5% bwoc, or in an amount of about 1% to about 5% bwoc. The swellable glass additive may be present in an amount of about 5% bwoc or less. One of ordinary skill in the art, with the benefit of this disclosure, will recognize the appropriate amount of swellable glass additive to use for a particular application.

Water is also included in the temporary plugging compositions. The water may include, for example, freshwater, saltwater (e.g., water containing one or more salts dissolved therein), brine (e.g., saturated saltwater produced from a subterranean formations), seawater, or any combination thereof. Generally, the water may be from any source, provided that the water does not contain an excess of compounds that may undesirably affect other components in the temporary plugging compositions. The water may be included in an amount sufficient to form a pumpable fluid. The water may be included in the temporary plugging compositions in an amount in a range of from about 40% to about 200% bwoc. The water may be included in an amount in a range of from about 40% to about 150% bwoc. One of ordinary skill in the art, with the benefit of this disclosure, will recognize the appropriate amount of water to use for a particular application.

Set accelerators may be included in the temporary plugging compositions to, for example, increase the rate of setting reactions. Control of setting time may allow for the ability to adjust to wellbore conditions or customize set times for individual jobs. Examples of suitable set accelerators may include, but are not limited to, aluminum sulfate, alums, calcium chloride, calcium sulfate, gypsum-hemihydrate, sodium aluminate, sodium carbonate, sodium chloride, sodium silicate, sodium sulfate, ferric chloride, or a combination thereof.

Set retarders may be included in the temporary plugging compositions to, for example, increase the thickening time of the temporary plugging compositions. Examples of suitable set retarders include, but are not limited to, ammonium, alkali metals, alkaline earth metals, borax, metal salts of calcium lignosulfonate, carboxymethyl hydroxyethyl cellulose, sulfoalkylated lignins, hydroxycarboxy acids, copolymers of 2-acrylamido-2-methylpropane sulfonic acid salt and acrylic acid or maleic acid, saturated salt, or a combination thereof. One example of a suitable sulfoalkylated lignin comprises a sulfomethylated lignin.

Weighting agents are typically materials that weigh more than water and may be used to increase the density of a temporary plugging composition. By way of example, weighting agents may have a specific gravity of about 2 or higher (e.g., about 2, about 4, etc.). Examples of weighting agents that may be used include, but are not limited to, hematite, hausmannite, and barite, and combinations thereof. Specific examples of suitable weighting agents include HI-DENSE® weighting agent, available from Halliburton Energy Services, Inc.

Lightweight additives may be included the temporary plugging compositions to, for example, decrease the density of the temporary plugging compositions. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Gas-generating additives may be included in the temporary plugging compositions to release gas at a predetermined time, which may be beneficial to prevent gas migration from the formation through the temporary plugging composition before it hardens. The generated gas may combine with or inhibit the permeation of the temporary plugging composition by formation gas. Examples of suitable gas-generating additives include, but are not limited to, metal particles (e.g., aluminum powder) that react with an alkaline solution to generate a gas.

Mechanical-property-enhancing additives may be included in the temporary plugging compositions to, for example, ensure adequate compressive strength and long-term structural integrity. These properties can be affected by the strains, stresses, temperature, pressure, and impact effects from a subterranean environment. Examples of mechanical property enhancing additives include, but are not limited to, carbon fibers, glass fibers, metal fibers, mineral fibers, silica fibers, polymeric elastomers, and latexes.

Dispersants may be included in the temporary plugging compositions. Where present, the dispersant should act, among other things, to control the rheology of the cement composition. While a variety of dispersants known to those skilled in the art may be used, examples of suitable dispersants include naphthalene sulfonic acid condensate with formaldehyde; acetone, formaldehyde, and sulfite condensate; melamine sulfonate condensed with formaldehyde; any combination thereof.

Defoaming additives may be included in the temporary plugging compositions to, for example, reduce tendency for the temporary plugging composition to foam during mixing and pumping of the temporary plugging compositions. Examples of suitable defoaming additives include, but are not limited to, polyol silicone compounds. Suitable defoaming additives are available from Halliburton Energy Services, Inc., under the product name D-AIR™ defoamers.

Foaming additives (e.g., foaming surfactants) may be included to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEAL-ANT™ 2000 agent, available from Halliburton Energy Services, Houston, Tex.

The temporary plugging compositions comprising a swellable glass additive, cementitious material, and water may be used in a variety of plugging applications. A method of the present invention may comprise providing a temporary plugging composition comprising a swellable glass additive, a cementitious material, and water; introducing the temporary plugging composition into a subterranean formation; and allowing the temporary plugging composition to set in the subterranean formation. As will be appreciated, the temporary plugging composition may be allowed to set in any suitable location in the subterranean formation where a plug may be desired. As used herein, introducing the cement composition into a subterranean formation includes introduction into any portion of the subterranean formation, including, without limitation, into a wellbore drilled into the subterranean formation, into a near wellbore region surrounding the wellbore, or into both. The plugging composition may be allowed to set into a hardened mass in the subterranean formation. For example, the hardened mass may form a plug in a wellbore in the subterranean formation and/or in one or more perforations in a casing and/or cement sheath in the wellbore.

A method for temporary plugging in a subterranean formation may comprise providing a composition comprising a cementitious material, water, and a swellable glass additive, wherein the swellable glass additive comprises a plurality of interconnected organosilica nanoparticles; and introducing the composition into a subterranean formation. The cementitious material in the composition may comprise kiln dust. The plurality of interconnected organosilica in the swellable glass additive may comprise a dried bridged organosiloxane sol-gel comprising a plurality of alkysiloxy substituents. The swellable glass additive may be present in the composition in an amount of about 0.1% to about 15% by weight of the cementitious material. The composition may have a density in a range of about 4 lb/gal to about 20 lb/gal. The composition may further comprise a dispersant. The method may further comprise allowing the composition to set in the subterranean formation to form a solid impermeable mass. The solid impermeable mass may form a plug in a well bore in the subterranean formation. The solid impermeable mass may form a plug in one or more perforations in a cement sheath and/or casing in the subterranean formation. The method may further comprise contacting the solid impermeable mass with an organic solvent. The organic solvent may be selected from the group consisting of kerosene, diesel, crude oil, produced oil, ethanol, acetonitrile, methyl-t-butyl ethyl, dichloromethane, hexane, octane, benzene, toluene, xylene, naphthalene, nitrobenzene, phenol, m-nitrophenol, trichloroethylene, perchloroethylene, dichloroethylene, vinyl chloride, a polycarbonated biphenyl, and any combination thereof. The method may further comprise allowing the organic solvent to contact the solid impermeable mass for a period of about 24 hours or longer.

A temporary plugging composition may comprise a cementitious material; a swellable glass additive, wherein the swellable glass additive comprises a plurality of interconnected organosilica nanoparticles; and water. The cementitious material in the temporary plugging composition may comprise kiln dust. The plurality of interconnected organosilica nanoparticles in the swellable glass additive may comprise a dried bridged organosiloxane sol-gel comprising a plurality of alkysiloxy substituents. The swellable glass additive be present in the temporary plugging composition in an amount of about 0.1% to about 10% by weight of the cementitious material. The temporary plugging composition may have a density of about 4 lb/gal. to about 20 lb/gal. The temporary plugging composition may further comprise an organic solvent. The organic solvent may be selected from the group consisting of kerosene, diesel, crude oil, produced oil, ethanol, acetonitrile, methyl-t-butyl ethyl, dichloromethane, hexane, octane, benzene, toluene, xylene, naphthalene, nitrobenzene, phenol, m-nitrophenol, trichloroethylene, perchloroethylene, dichloroethylene, vinyl chloride, a polycarbonated biphenyl, and any combination thereof.

A plugging system may comprise a plugging composition comprising a cementitious material, a swellable glass additive, and water; wherein the swellable glass additive comprises a plurality of interconnected organosilica nanoparticles; an organic solvent; mixing equipment capable of mixing the cementitious material, swellable glass additive, and water; and pumping equipment capable of pumping the plugging composition and/or the organic solvent. The plurality of interconnected organosilica nanoparticles in the swellable glass additive may comprise a dried bridged organosiloxane sol-gel comprising a plurality of alkysiloxy substituents, and the organic solvent may kerosene. The plugging system may comprise kiln dust as the cementitious material. The plugging system may comprise the swellable glass additive be present in the plugging composition in an amount of about 0.1% to about 15% by weight of the cementitious material. The plugging composition may have a density in a range of about 4 lb/gal to about 20 lb/gal. The plugging composition may further comprise a dispersant. The organic solvent in the plugging system may be selected from the group consisting of kerosene, diesel, crude oil, produced oil, ethanol, acetonitrile, methyl-t-butyl ethyl, dichloromethane, hexane, octane, benzene, toluene, xylene, naphthalene, nitrobenzene, phenol, m-nitrophenol, trichloroethylene, perchloroethylene, dichloroethylene, vinyl chloride, a polycarbonated biphenyl, and any combination thereof.

Example methods of using the temporary plugging composition will now be described in more detail with reference to FIGS. 1-4. FIG. 1 illustrates a system 5 for preparation of a temporary plugging composition comprising a swellable glass additive, a cementitious material, and water and the delivery of the temporary plugging composition to a wellbore. As shown, the temporary plugging composition may be mixed in mixing equipment 10, such as a jet mixer, re-circulating mixer, or a batch mixer, for example, and then pumped via pumping equipment 15 to the wellbore. The mixing equipment 10 and the pumping equipment 15 may be disposed on one or more cement trucks as will be apparent to those of ordinary skill in the art. A jet mixer may be used, for example, to continuously mix a dry blend comprising the cementitious material and the swellable glass additive, for example, with the water as it is being pumped to the wellbore. Any of the embodiments of a temporary plugging composition described herein may apply in the context of FIG. 1.

Figure 2:
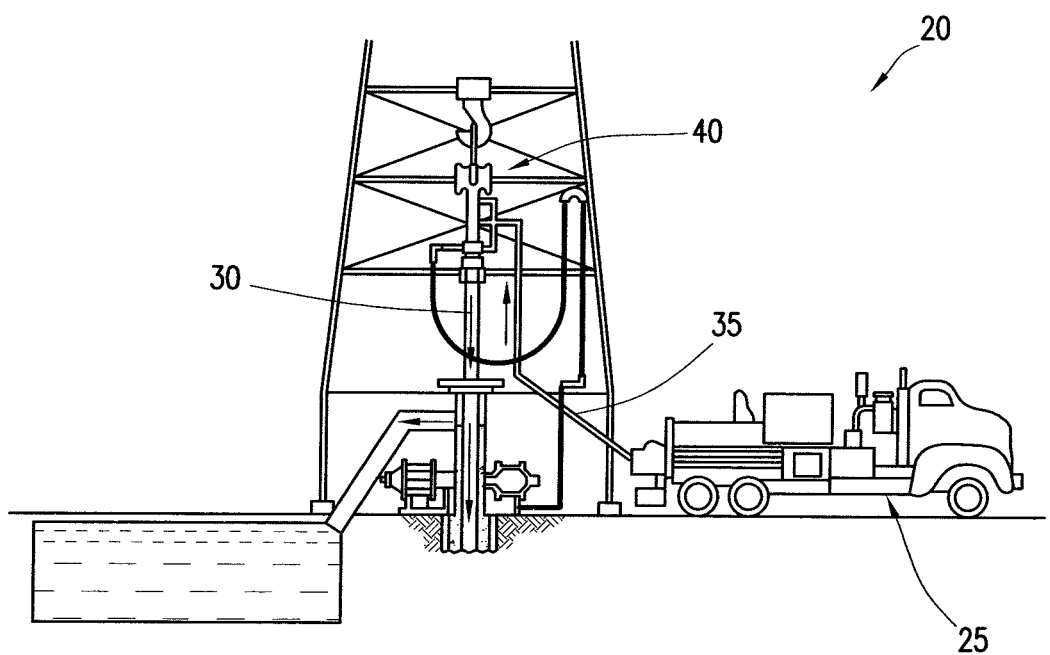
FIG. 2 is a schematic illustration of surface equipment that may be used in the placement of a plugging composition comprising a cementitious material and a swellable glass additive in a wellbore in accordance with certain embodiments.

An example technique for placing a temporary plugging composition into a subterranean formation will now be described with reference to FIGS. 2 and 3. FIG. 2 illustrates surface equipment 20 that may be used in the placement of a temporary plugging composition. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 20 may include a cementing unit 25, which may include one or more cement trucks. The cementing unit 25 may include mixing equipment 10 and pumping equipment 15 (as shown in FIG. 1) as will be apparent to those of ordinary skill in the art. The cementing unit 25 may pump a temporary plugging composition 30, which may comprise a cementitious material, a swellable glass additive, and water, through a feed pipe 35 and to a cementing head 40 which conveys the temporary plugging composition 30 downhole. Any of the embodiments of a temporary plugging composition described herein may apply in the context of FIG. 2.

Figure 3:
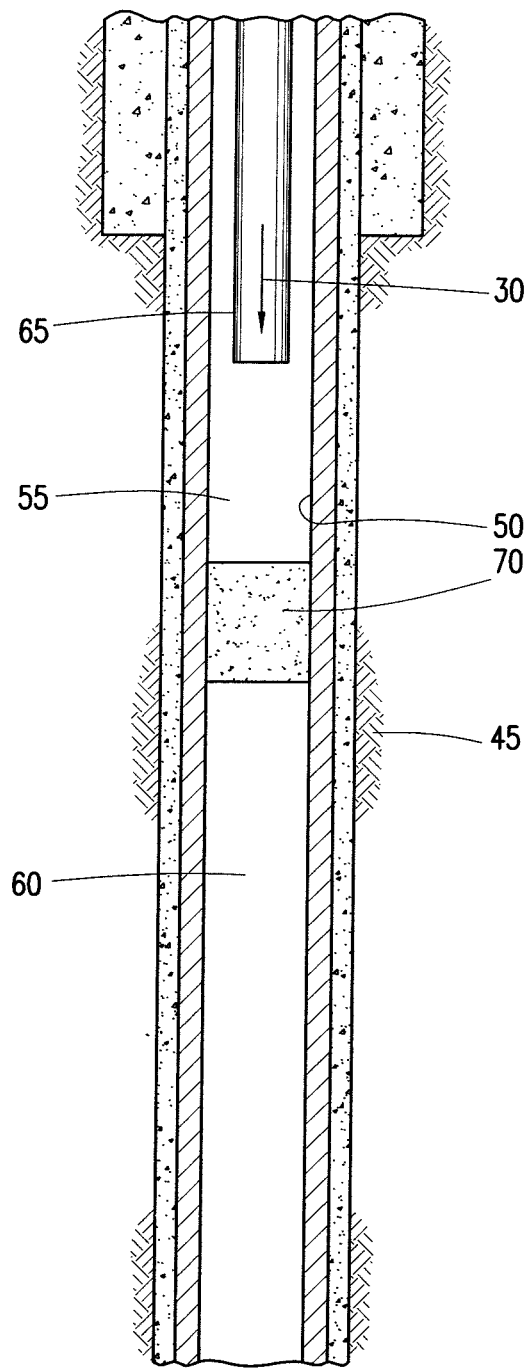
FIG. 3 is a schematic illustration of the placement of a plugging composition comprising a cementitious material and a swellable glass additive into a wellbore in accordance with certain embodiments.

Turning now to FIG. 3, the temporary plugging composition 30 may be placed into a subterranean formation 45. As illustrated, a wellbore 50 may be drilled into one or more subterranean formations 45. While the wellbore 50 is shown extending generally vertically into the one or more subterranean formation 45, the principles described herein are also applicable to wellbores that extend at an angle through the one or more subterranean formations 45, such as horizontal and slanted wellbores. Similarly, a cased wellbore is shown in FIG. 3, however, the wellbore 50 need not be cased. Temporary plugging composition 30, once placed into wellbore 50 divides wellbore 50 into an upper portion 55 and a lower portion 60 which are separated by the placed temporary plugging composition. Both or either portions 55 and 60 may contain wellbore fluids which may mix with a portion of temporary plugging composition 30. The temporary plugging composition 30 is placed in wellbore 50 via coiled tubing 65. It should be understood, however, that temporary plugging composition 30 might be placed by other strings of tubular members such as a casing string or production tubing. The coiled tubing 65 may be made up of a number of interconnected tubular components above and/or below the placed temporary plugging composition 30.

Placement of temporary plugging composition 30 via coiled tubing 65, generally entails inserting coiled tubing 65 to the desired depth and pumping temporary plugging composition 30 via pumping equipment 15 (as shown in FIG. 1) into the wellbore 50. Temporary plugging composition 30 may be pumped down coiled tubing 65 until it exits at the desired zone of wellbore 50 in which isolation is sought. Once placed, temporary plugging composition 30 is allowed to set and harden into a solid mass, illustrated as plug 70 on FIG. 3. Once temporary plugging composition 30 has set, upper portion 55 and lower portion 60 of wellbore 50 may be isolated from each other by plug 70 which blocks fluid flow between the upper portion 55 and lower portion 60. At this time, other operations may be conducted in wellbore 50 if desired. Any of the embodiments of a temporary plugging composition described herein may apply in the context of FIG. 3.

Figure 4:
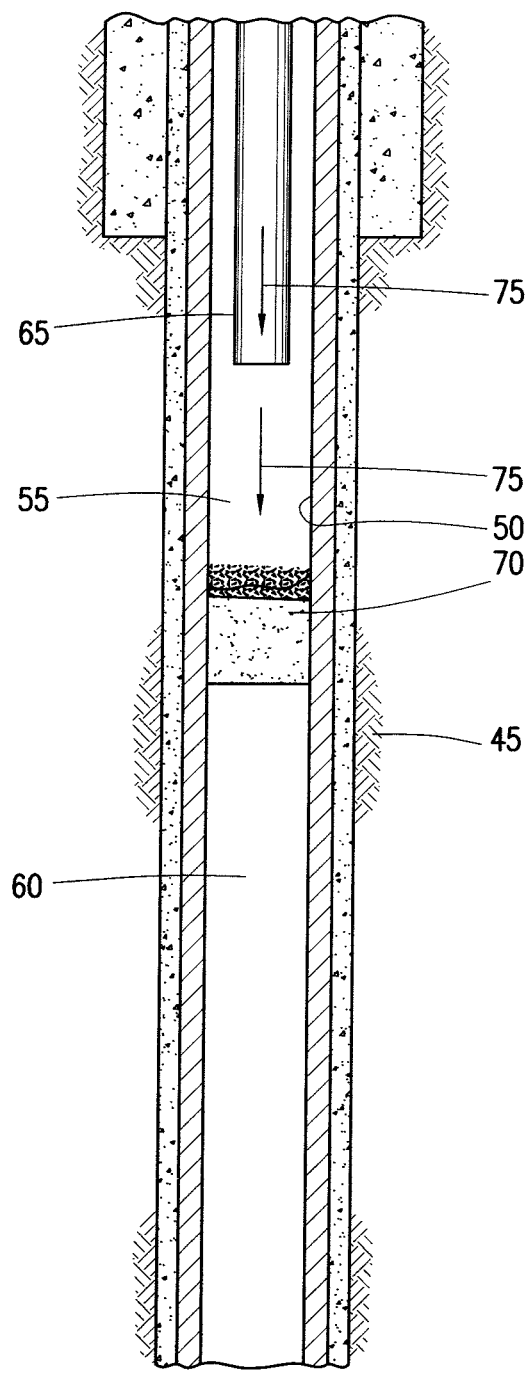
FIG. 4 is a schematic illustration of the removal of a plug formed from a plugging composition comprising a cementitious material and a swellable glass additive in accordance with certain embodiments.

FIG. 4 illustrates the removal of plug 70. When it is desired to remove plug 70, tubing, such as coiled tubing 65 or any other type of sufficient tubing, may be inserted into wellbore 50 in a manner such that organic solvent 75 pumped from the coiled tubing 65 may contact plug 70. Organic solvent 75 may be any of the organic solvents described herein. As organic solvent 75 contact a portion of plug 70. The swellable glass additive within plug 70 that is exposed to organic solvent 75 may begin to swell. As the swellable glass additive swells it exerts a force against the set cementitious particles of the cementitious material in plug 70. Thus, when the force exerted by the swelling of the swellable glass additive exceeds the bond strength of the set cementitious particles of the cementitious material in plug 70, plug 70 may begin to fracture. As plug 70 fractures, more of the swellable glass additive may be contacted by organic solvent 75 as organic solvent 75 seeps into the newly formed fractures in plug 70. This seepage may induce further swelling of the swellable glass additive and subsequently more fracturing of plug 70. This process may continue until plug 70 is comprised of several smaller pieces of set cementitious particles and no longer comprises one solid impermeable mass. As plug 70 is fractured into smaller pieces, it is no longer capable of sealing and isolating upper portion 55 and lower portion 60 of wellbore 50 and thus flow between the upper portion 55 and lower portion 60 may be reestablished. The fractured pieces of plug 70 may be pumped out of wellbore 50 if desired. The fracturing of plug 70 may not require additional fracturing steps or tools such as drilling through the plug, or fracturing the plug with fracturing equipment such as impact rods, bars, or high pressure fluids. Any of the embodiments of a temporary plugging composition described herein may apply in the context of FIG. 4.

The preceding description provides various embodiments of the temporary plugging compositions containing different additives and concentrations thereof, as well as methods of using the temporary plugging compositions. It should be understood that, although individual embodiments may be discussed herein, the present disclosure covers all combinations of the disclosed embodiments, including, without limitation, the different additive combinations, additive concentrations, and fluid properties.

The exemplary temporary plugging compositions disclosed herein may directly or indirectly affect one or more components or pieces of equipment associated with the preparation, delivery, recapture, recycling, reuse, and/or disposal of the disclosed temporary plugging compositions. For example, the temporary plugging compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary temporary plugging compositions and fluids containing the same. The disclosed temporary plugging compositions may also directly or indirectly affect any transport or delivery equipment used to convey the temporary plugging compositions to a well site or downhole such as, for example, any transport vessels, conduits, pipe-lines, trucks, tubulars, and/or pipes used to compositionally move the temporary plugging compositions from one location to another, any pumps, compressors, or motors (e.g., topside or downhole) used to drive the temporary plugging compositions, or fluids containing the same, into motion, any valves or related joints used to regulate the pressure or flow rate of the temporary plugging compositions (or fluids containing the same), and any sensors (i.e., pressure and temperature), gauges, and/or combinations thereof, and the like. The disclosed temporary plugging compositions may also directly or indirectly affect the various downhole equipment and tools that may come into contact with the temporary plugging compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present embodiments, the following examples of some of the preferred embodiments are given. In no way should such examples be read to limit, or to define, the scope of the disclosure.

Example 1

A temporary plugging composition comprising 1010 g of cement kiln dust, 428 g of water, 10.10 g of dispersant, and 50.50 g of swellable glass additive was mixed in a Waring® blender at 2000 rpm for 3 minutes. The dispersant was CFR-3™ Cement Friction Reducer, available from Halliburton Energy Services, Inc., of Houston, Tex. The swellable glass additive was Osorb® swellable glass, available from ABSMaterials, Inc. of Wooster, Ohio. After blending, the destructive 24-hour compressive strength of the sample was measured. The destructive compressive strength was measured by allowing samples of the composition to cure in 2" by 4" plastic cylinders that were cured in a water bath at 180° F. for 24 hours to form set cylinders. Immediately after removal from the water bath, the destructive compressive strengths were determined using a mechanical press in accordance with API RP 10B-2, *Recommended Practice for Testing Well Cements*. The compressive strength averaged 686 psi. The reported compressive strengths are an average for three (3) cylinders. Additionally, three sections of the cured sample were placed into a beaker of kerosene. It was visually observed that within 5 minutes, the surface of the sections began to flake off. After 24 hours of submersion in kerosene, the sections had crumbled into several smaller pieces. The average particle size distribution of the crumbled plug sections is displayed in Table 1 below.

TABLE 1

| Particle Size Distribution | | |
|---|---|---|
| D10 (μm) | D50 (μm) | D90 (μm) |
| 88.6 | 518 | 1670 |

Figure 5:
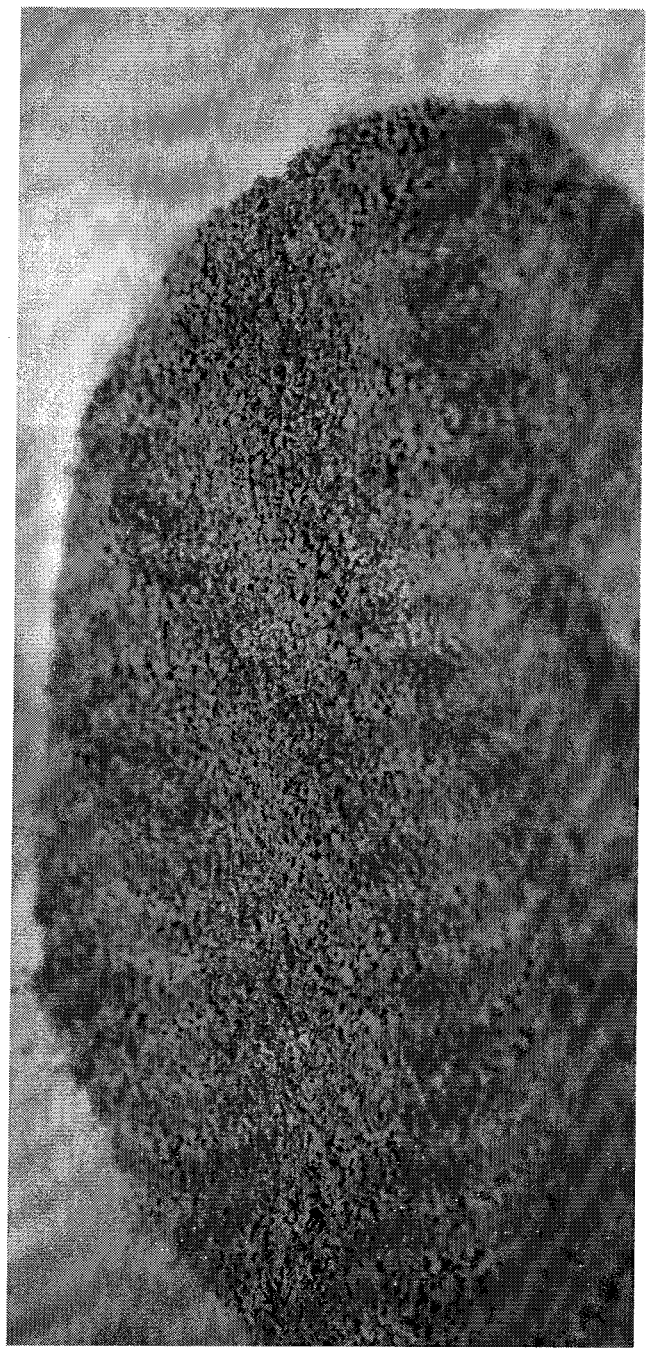
FIG. 5 is a photograph of a set plugging composition after contact with an organic solvent and in accordance with certain embodiments.

The results indicate that exposure of a solid mass of a set temporary plugging composition to an organic solvent such as kerosene, causes the solid mass of set cementitious material to fracture and crumble into smaller particles. FIG. 5 shows the resultant particles of the plug after exposure to kerosene and dried.

Example 2

Figure 6:
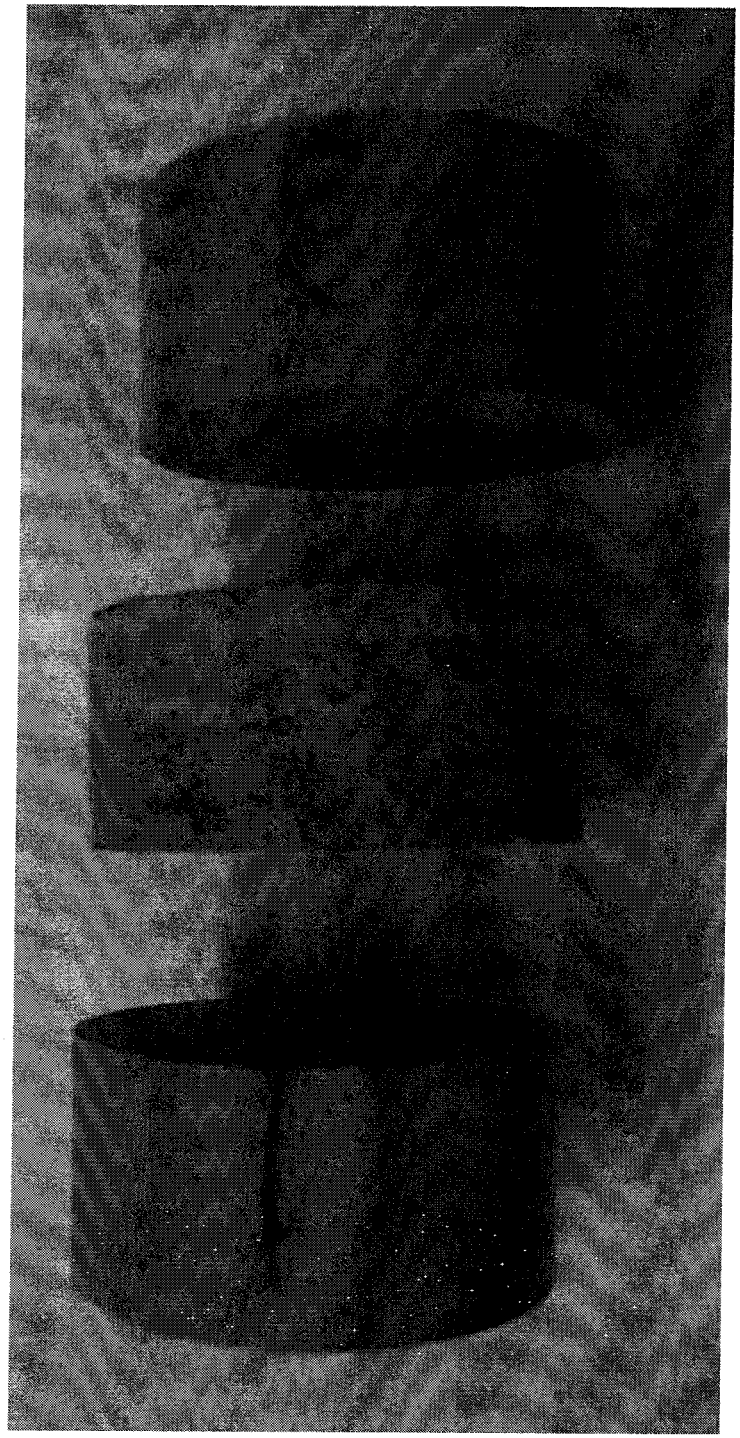
FIG. 6 is a photograph of a set plugging composition cut into three sections in accordance with certain embodiments.

Two temporary plugging compositions were produced. The first (i.e. Sample 1) of the compositions comprised a combination cementitious material that was 300 g (i.e. 75%) Class H Portland cement and 100 g (i.e. 25%) cement kiln dust. Additionally 40 g (i.e. 10% bwoc) swellable glass additive and 182.4 g (i.e. 45.6% bwoc) water were added. The second (i.e. Sample 2) of the compositions comprised a cementitious material that was 400 g (i.e. 100%) Class H Portland cement. Additionally 40 g (i.e. 10% bwoc) swellable glass additive and 165 g (i.e. 41.25% bwoc) water were added. Both Sample 1 and Sample 2 were mixed separately in a Waring® blender at 2000 rpm for 3 minutes. The swellable glass additive was Osorb® swellable glass, available from ABSMaterials, Inc. of Wooster, Ohio. The samples were cured in 2" by 4" plastic cylinders in a water bath at 180° F. for 24 hours to form set cylinders. Three sections of each cured Sample were placed into a beaker of kerosene. FIG. 6 shows an example of the three sections of Sample 2 before contact with kerosene. After 24 hours of submersion in kerosene, the Samples were visually inspected.

Figure 7:
FIG. 7 is a photograph of a set plugging composition in contact with an organic solvent in accordance with certain embodiments.

The outermost surfaces of each section of Sample 1 had fractured into smaller pieces and the overall sizes of each section were reduced. This reduction appears great enough to speculate that the section would not form an impermeable plug, however the larger size of the remaining sections may impede flow to some degree and therefore may require additional contact time with the organic solvent in order to further fracture the Sample. FIG. 7 illustrates the three sections of Sample 1 after contact with Kerosene.

Figure 8:
FIG. 8 is a photograph of a set plugging composition in contact with an organic solvent in accordance with certain embodiments.

Sample 2 had two sections that had been fractured in a very similar manner as the sections in Sample 1. However, one of the sections of Sample 2 saw very little fracturing. This may be due to insufficient mixing of the swellable glass additive with the composition so that the swellable glass additive was not evenly distributed throughout Sample 2. FIG. 8 illustrates the three sections of Sample 2 after contact with kerosene.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method for temporary plugging in a subterranean formation comprising:
   providing a composition comprising a cementitious material, water, and a swellable glass additive;
   introducing the composition into a subterranean formation;
   allowing the composition to set into a single solid mass; and
   allowing the swellable glass additive to swell, such that the swelling of the swellable glass additive fractures the solid mass into two or more masses.

2. The method of claim 1 wherein the cementitious material comprises kiln dust.

3. The method of claim 1 wherein the swellable glass additive comprises a plurality of interconnected organosilica nanoparticles comprise a dried bridged organosiloxane sol-gel comprising a plurality of alkysiloxy substituents.

4. The method of claim 1 wherein the swellable glass additive is present in the composition in an amount of about 0.1% to about 15% by weight of the cementitious material.

5. The method of claim 1 wherein the composition has a density in a range of about 4 lb/gal to about 20 lb/gal.

6. The method of claim 1 wherein the composition further comprises a dispersant.

7. The method of claim 1 wherein the solid mass is a solid impermeable mass.

8. The method of claim 1 wherein the solid mass forms a plug in a well bore in the subterranean formation.

9. The method of claim 1 wherein the solid mass forms a plug in one or more perforations in a cement sheath, casing, or combination thereof in the subterranean formation.

10. The method of claim 1, wherein the allowing the swellable glass additive to swell further comprises contacting the solid mass with an organic solvent.

11. The method of claim 10 wherein the organic solvent comprises an organic solvent selected from the group consisting of kerosene, diesel, crude oil, produced oil, ethanol, acetonitrile, methyl-t-butyl ethyl, dichloromethane, hexane, octane, benzene, toluene, xylene, naphthalene, nitrobenzene, phenol, m-nitrophenol, trichloroethylene, perchloroethylene, dichloroethylene, vinyl chloride, a polycarbonated biphenyl, and any combination thereof.

12. The method of 10 wherein the organic solvent is allowed to contact the solid mass for a period of about 24 hours or longer.

13. The method of claim 1 wherein the swellable glass additive comprises a plurality of interconnected organosilica nanoparticles.

14. The method of claim 1 further comprising mixing the cementitious material, the swellable glass additive, and the water to form the composition; and pumping the composition into a wellbore via pumping equipment.

* * * * *